(12) United States Patent
Hlubina et al.

(10) Patent No.: US 10,214,091 B2
(45) Date of Patent: Feb. 26, 2019

(54) UNDERBODY FOR THE CO-INSTALLATION OF AN ELECTRIC ENGINE AND A HEAT ENGINE

(71) Applicant: RENAULT s.a.s., Boulogne Billancourt (FR)

(72) Inventors: Thierry Hlubina, Chaville (FR); Herve Gaumont, Velizy (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 15/513,814

(22) PCT Filed: Sep. 22, 2015

(86) PCT No.: PCT/FR2015/052540
§ 371 (c)(1),
(2) Date: Mar. 23, 2017

(87) PCT Pub. No.: WO2016/046491
PCT Pub. Date: Mar. 31, 2016

(65) Prior Publication Data
US 2017/0246945 A1    Aug. 31, 2017

(30) Foreign Application Priority Data
Sep. 24, 2014    (FR) .................................... 14 58988

(51) Int. Cl.
*B60K 6/40*    (2007.10)
*B62D 25/20*    (2006.01)
(Continued)

(52) U.S. Cl.
CPC ............. *B60K 6/40* (2013.01); *B62D 21/152* (2013.01); *B62D 25/20* (2013.01);
(Continued)

(58) Field of Classification Search
CPC ...... B60K 6/40; B62D 25/20; B62D 25/2018; B62D 25/2027
See application file for complete search history.

(56) References Cited

U.S. PATENT DOCUMENTS 4,881,756 A * 11/1989 Kumasaka ............. B62D 21/12
280/785
6,059,058 A *  5/2000 Dower ..................... B60K 1/04
180/298
(Continued)

FOREIGN PATENT DOCUMENTS

DE         101 54 353 A1    5/2002
DE    10 2011 012 496 A1    8/2012
EP          2 441 653 A1    4/2012

OTHER PUBLICATIONS

International Search Report dated Dec. 2, 2015 in PCT/FR15/052540 Filed Sep. 22, 2015.
(Continued)

*Primary Examiner* — Brian L Swenson
(74) *Attorney, Agent, or Firm* — Oblon, McClelland, Maier & Neustadt, L.L.P.

(57) ABSTRACT

A range includes at least two different motor vehicles with a structural body having a central underbody part delimiting a lower part of a cab. The central underbody part of the first vehicle receives two seats. The central underbody part of the second vehicle receives four seats. Each central underbody part includes first interface elements allowing mounting thereon of components associated with the function of an internal combustion drive engine mounted on a rear structural part of the structural body which is firmly attached to the central underbody part. Each central underbody part also includes second interface elements allowing mounting thereon of components associated with the function of an electric drive motor to be mounted on the rear structural part.

(Continued)

A rear edge of the central underbody part of each vehicle is equipped with a same interface element for connection to the rear structural part of the structural body.

10 Claims, 4 Drawing Sheets

(51) Int. Cl.
    *B62D 63/02*     (2006.01)
    *B62D 21/15*     (2006.01)

(52) U.S. Cl.
    CPC ..... *B62D 25/2018* (2013.01); *B62D 25/2027* (2013.01); *B62D 63/025* (2013.01); *Y10S 903/951* (2013.01)

(56) References Cited

U.S. PATENT DOCUMENTS

| | | | | |
|---|---|---|---|---|
| 6,276,477 | B1* | 8/2001 | Ida | B62D 21/07 |
| | | | | 180/89.1 |
| 6,896,319 | B1* | 5/2005 | Huang | B62D 21/12 |
| | | | | 296/193.04 |
| 7,287,797 | B1* | 10/2007 | Belloso | B62D 21/03 |
| | | | | 296/181.2 |
| 2004/0104568 | A1* | 6/2004 | Tronville | B62D 21/02 |
| | | | | 280/781 |
| 2004/0163875 | A1* | 8/2004 | Chernoff | B60G 17/0195 |
| | | | | 180/312 |
| 2004/0195014 | A1* | 10/2004 | Chernoff | B62D 24/02 |
| | | | | 180/65.1 |
| 2012/0043147 | A1* | 2/2012 | Milner | B60K 1/04 |
| | | | | 180/68.5 |
| 2014/0138941 | A1* | 5/2014 | Lin | B62D 25/2009 |
| | | | | 280/785 |
| 2014/0338996 | A1* | 11/2014 | Baccouche | B62D 21/157 |
| | | | | 180/68.5 |
| 2015/0027795 | A1* | 1/2015 | Hirai | B60K 1/00 |
| | | | | 180/60 |
| 2017/0197678 | A1* | 7/2017 | Scaringe | B62D 63/025 |

OTHER PUBLICATIONS

French Search Report dated May 11, 2015 in French Application No. 1458988 Filed Sep. 24, 2014.

\* cited by examiner

UNDERBODY FOR THE CO-INSTALLATION OF AN ELECTRIC ENGINE AND A HEAT ENGINE

TECHNICAL FIELD OF THE INVENTION

The invention concerns a central underbody part of the structural body of a motor vehicle, intended to delimit the lower part of a vehicle cab and to be interposed between the front and rear structural parts.

The object of the invention is also a structural body of a motor vehicle comprising such a central underbody part.

PRIOR ART

At present, underbodies of motor vehicles are dedicated to a given engine type selected from an internal combustion (heat) engine or an electric motor. For the same vehicle platform, an underbody associated with the internal combustion engine and another different underbody associated with the electric motor must therefore be designed and produced.

For internal combustion engines installed in a front structural unit of the body, the fuel tank is installed below the floor of the rear structural unit. The floor of the central underbody part is a floor situated at a height at which it extends below the inner members which border the longitudinal edges of the central part.

For electric vehicles however, the underbodies are dedicated solely to this type of motor and cannot be used with an internal combustion engine. In particular, the central underbody part comprises a floor arranged in two zones at two different heights: a high rear zone which allows provision of a volume below the floor to receive an electrical energy storage battery intended to supply the internal combustion drive engine with electricity, and a low front zone which, on the cab side, delimits a volume able to receive the feet of the occupants of the vehicle.

This problem of having to create a pair of underbodies dedicated respectively to the internal combustion engine and to the electric motor proposed on the same platform, has an effect on each desired length of vehicle: it is necessary to create as many pairs of underbodies as proposed lengths for the vehicle for a same platform, for example one such pair in the case of a vehicle with two seats, and another such pair in the case of a vehicle with four seats.

OBJECT OF THE INVENTION

The object of the present invention is to propose a range of at least two different types of motor vehicle with a central underbody part of the structural body of a motor vehicle which remedies the above-mentioned drawbacks.

In particular, it is an object of the invention to provide such a central underbody part and a structural body which allows the alternative installation of either an electric motor or an internal combustion engine for the same platform, and which facilitates the adaptation in length of the vehicle, while limiting the simplicity, costs and flexibility.

This object may be achieved thanks to a range of at least two different types of motor vehicle, each comprising a structural body comprising a central underbody part delimiting the lower part of the cab of each type of vehicle, the vehicle of the first type being provided with an internal combustion drive engine of the vehicle mounted on a rear structural part of the structural body, while the vehicle of the second type is provided with an electric drive motor of the vehicle mounted on the rear structural part of the structural body, characterized in that the central underbody part comprises:

a set of first interface elements allowing mounting, on the central underbody part, of components of a first type associated with the vehicle of the first type, and a set of second interface elements allowing mounting, on the central underbody part, of components of a second type associated with the vehicle of the second type, a rear edge of the central underbody part of the first type and a rear edge of the central underbody part of the second type being equipped with a same interface element for connection to the rear structural part of the structural body.

According to other advantageous characteristics of the invention, considered in isolation or in combination:

- the set of first interface elements and the set of second interface elements are arranged in a same zone of the central underbody part in a longitudinal direction of the vehicle;
- the length of the central underbody part in the longitudinal direction is configured such that the central underbody part can receive two seats offset in a lateral direction of the vehicle, the central underbody part constituting a first type of central underbody part;
- the set of first interface elements is arranged in a first zone of the central underbody part in the longitudinal direction, and the set of second interface elements is arranged in a second zone of the central underbody part in the longitudinal direction, the first and second zones being separate;
- the length of the central underbody part in the longitudinal direction is configured such that the central underbody part can receive four seats distributed in two rows offset in the longitudinal direction and each containing two seats offset in the lateral direction of the vehicle, the central underbody part constituting a second type of central underbody part, in particular configured so as to include the central underbody part of the first type;
- the first and second zones are offset relative to each other in the longitudinal direction and are constituted respectively by a rear zone of the central underbody part and by a front zone of the central underbody part;
- the set of first interface elements comprises elements allowing mounting, below a floor of the central underbody part, of a fuel storage tank intended to supply the internal combustion drive engine and of components associated with the function of said tank, and in that the set of second interface elements comprises elements allowing mounting, below the floor of the central underbody part, of an electrical energy storage battery intended to supply the electric drive motor and of components associated with the function of said battery;
- along each of its longitudinal edges, the central underbody part comprises an inner member, and the floor of the central underbody part is mounted at the upper part of the inner member so as to provide a space below the floor on the side opposite the cab in a vertical direction, said space being able to house either said tank or said battery.

The invention also concerns a structural body of a motor vehicle comprising a central underbody part of a range of at least two different types of motor vehicle having all or some of the preceding characteristics, and a rear structural part firmly attached to the rear edge of the central underbody part, the rear structural part carrying either the internal combustion drive engine associated with the components mounted on the central underbody part via the set of first interface elements, or the electric drive motor associated with the components mounted on the central underbody part via the set of second interface elements.

According to further advantageous characteristics of the invention:

the structural body comprises a front structural part including at least one front side member, the assembly being arranged such that the central underbody part is interposed between the front structural part and the rear structural part in the longitudinal direction, and that the structural body comprises at least one structural piece ensuring an absorption of forces and/or a transmission of forces firstly between the front side member and at least one inner member arranged along a longitudinal edge of the central underbody part, and secondly between the front side member and a structural longitudinal tunnel of the central underbody part centered in the width of the central underbody part;

the structural longitudinal tunnel is delimited by a profiled piece attached to the floor of the central underbody part so as to be oriented in the longitudinal direction and so as to delimit, in combination with the floor, a hollow reinforcing body of tubular form with a section having a closed contour, arranged below the floor.

BRIEF DESCRIPTION OF THE DRAWINGS

Further advantages and characteristics will appear more clearly from the description below of particular embodiments of the invention, given merely as non-limitative examples and depicted on the attached drawings in which.

DESCRIPTION OF PREFERRED EMBODIMENTS OF THE INVENTION

The description below is given with reference to an orthonormal reference system (X, Y, Z) conventionally associated with a motor vehicle, in which X is the front-rear, horizontal, longitudinal direction of the vehicle; Y is the right-left, transverse direction which is horizontal and perpendicular to X; and Z is the vertical direction, perpendicular to both directions X and Y. These directions may be considered as linked to the structural body of the vehicle and hence also to the motor vehicle.

The central underbody part 10 of the structural body of the motor vehicle, visible in particular on FIGS. 2 to 7 and intended to delimit the lower part of a vehicle cab, comprises:

a set of first interface elements allowing mounting, on the central underbody part 10, of components of the first type associated with the function of an internal combustion drive engine 11 of the vehicle and intended to be mounted on a rear structural part 100 of the structural body firmly attached to the central underbody part 10, and a set of second interface elements allowing mounting, on the central underbody part 10, of components of the second type associated with the function of an electric drive motor 12 of the vehicle and intended to be mounted on said rear structural part 100.

Figure 1:
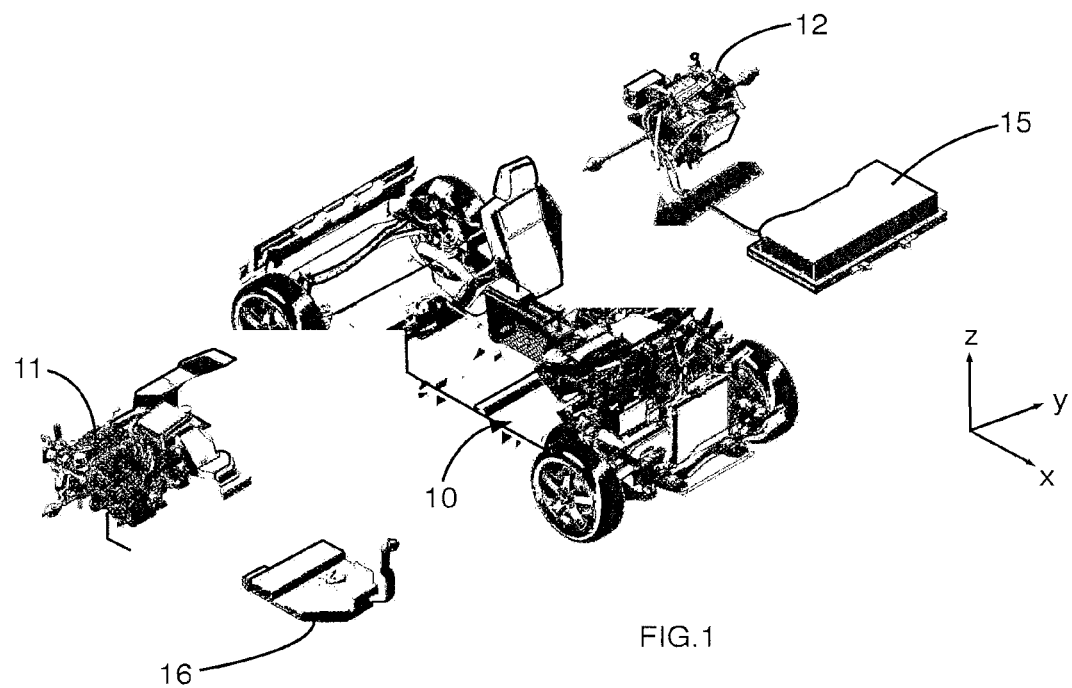
FIG. 1 is a perspective view illustrating an exploded diagram of part of a motor vehicle equipped with a central underbody part according to the invention.
Figure 2:
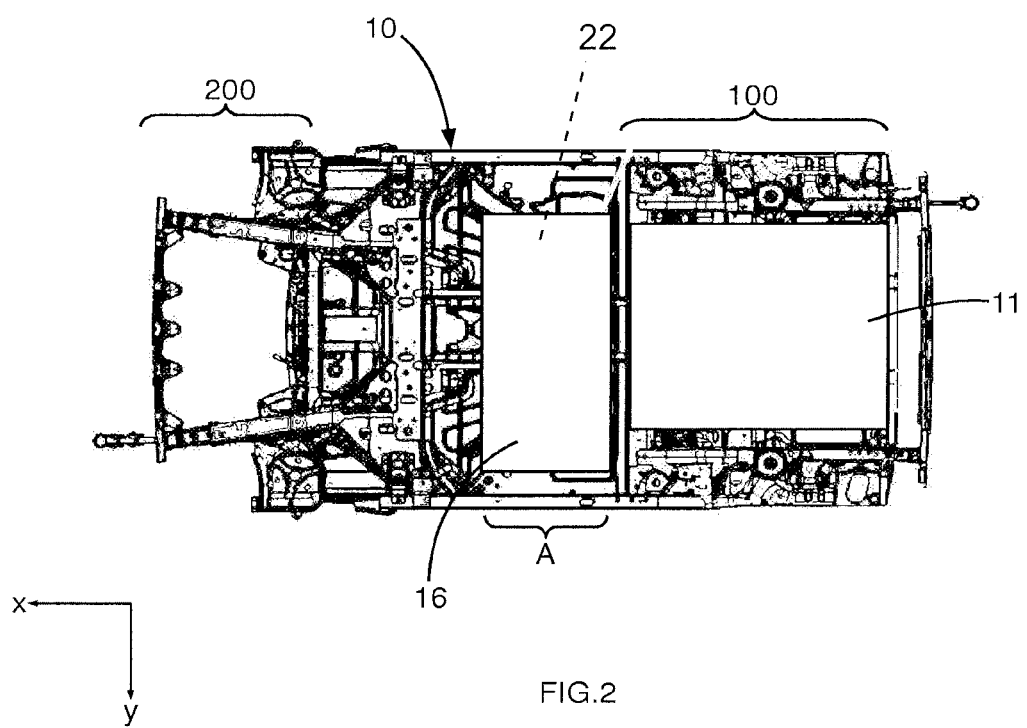
FIG. 2 is a top view of the structural body in the case of an internal combustion engine, equipped with the first type of central underbody part.
Figure 3:
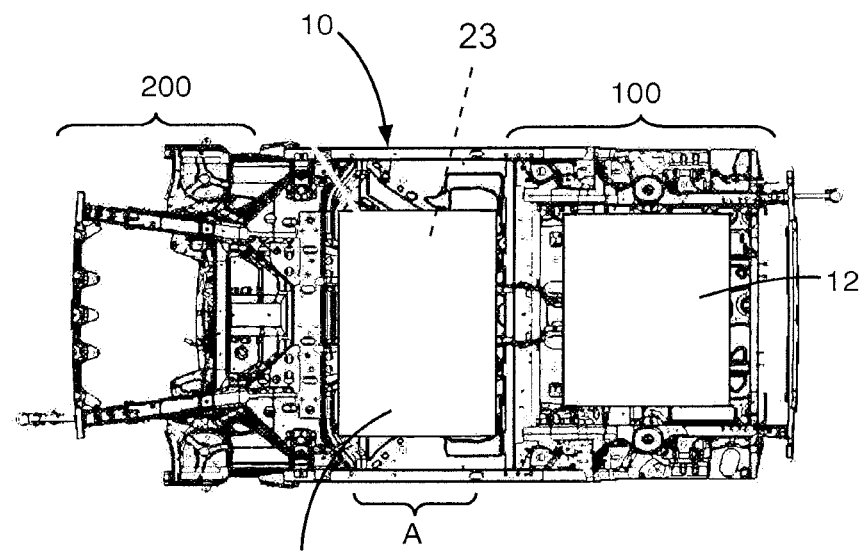
FIG. 3 is a top view of the structural body in the case of an electric motor, equipped with the first type of central underbody part.

With reference to FIGS. 2 and 3 which concern a first type of central underbody part 10 defined below, the set of first interface elements (22 in FIG. 2) and the set of second interface elements (23 in FIG. 3) may in this variant be arranged in a same single zone of the central underbody part 10 in the longitudinal direction X. This single zone is marked A on FIGS. 2 and 3.

In order to constitute the first type of central underbody part 10, the length L1 (FIG. 6) of the central underbody part 10 in the longitudinal direction X is preferably configured such that the central underbody part 10 may receive two seats offset relative to each other in the lateral direction Y.

Figure 4:
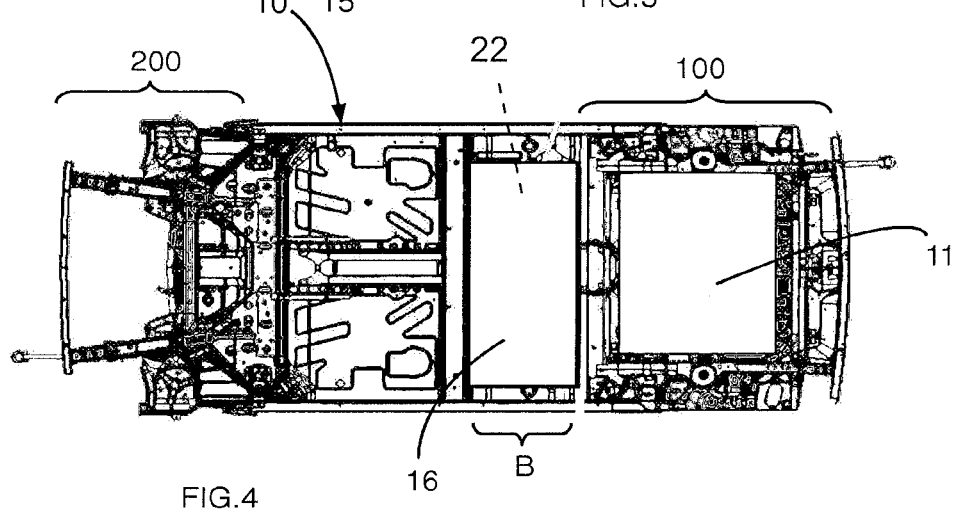
FIG. 4 is a top view of the structural body in the case of an internal combustion engine, equipped with the second type of central underbody part.
Figure 5:
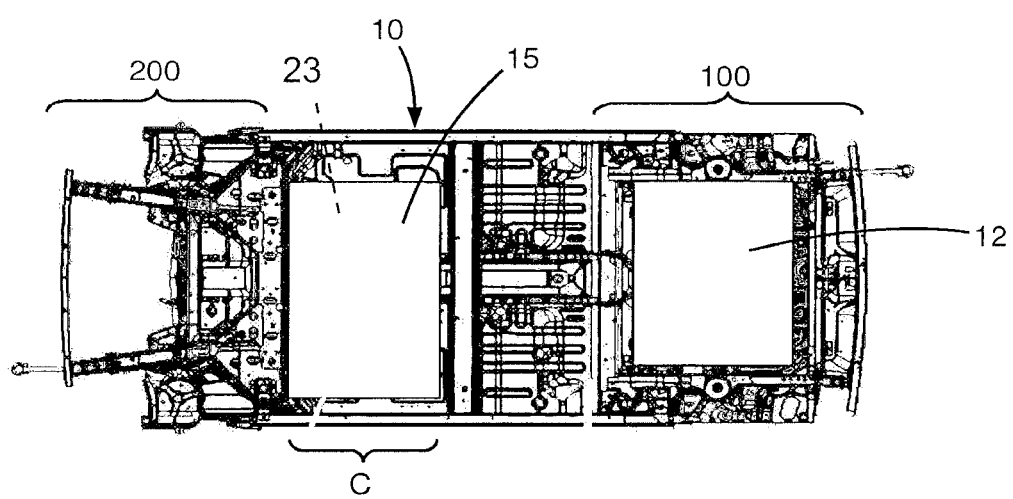
FIG. 5 is a top view of the structural body in the case of an electric motor, equipped with the second type of central underbody part.
Figure 6:
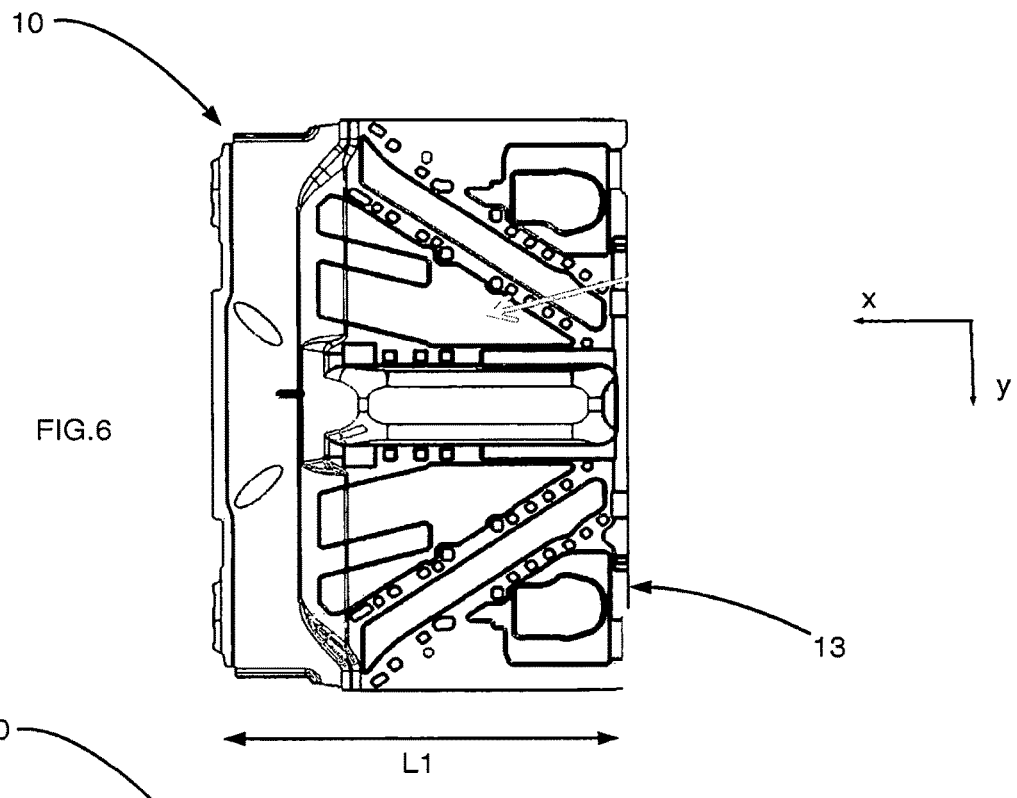
FIGS. 6 and 7 illustrate in top view the central underbody parts of respectively the first and second types.
Figure 7:
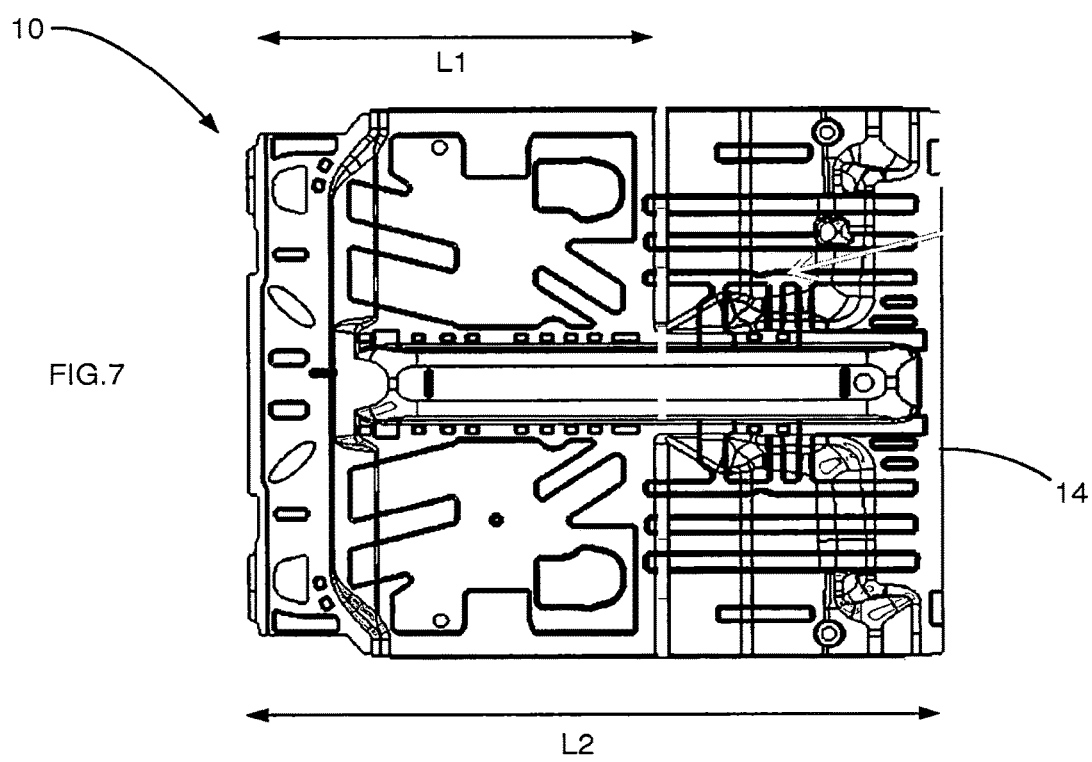

With reference now to FIGS. 4 and 5 which concern a second type of central underbody part 10 defined below, the set of first interface elements (22 in FIG. 4) is arranged in a first zone B of the central underbody part 10 in the longitudinal direction X, and the set of second interface elements (23 in FIG. 5) is arranged in a second zone C of the central underbody part 10 in the longitudinal direction X, the first and second zones B and C being separate.

In the above, with respect both to the single zone A mentioned for the first type of central underbody part 10 and to the first and second zones B and C mentioned for the second type of central underbody part, a "zone" preferably refers to a part of the central underbody part 10 delimited over a fraction of the length of the central part 10 in the longitudinal direction X and at the same time over the entire width of the central part 10 in the lateral direction Y.

In order to constitute the second type of central underbody part 10, the length L2 (FIG. 7) of the central underbody part 10 in the longitudinal direction X is preferably configured such that the central underbody part 10 may receive four seats distributed in two rows, offset relative to each other in the longitudinal direction X and each containing two seats offset relative to each other in the lateral direction Y of the vehicle.

Preferably, the second type of central underbody part 10 is configured so as to include the central underbody part 10 of the first type. In particular, it is the front portion (in the longitudinal direction X) of the central part 10 of the second type which is identical to the central part 10 of the first type, the central part of the second type also including an additional rear portion. These front and rear portions are integral, in order finally to constitute a monobloc central part of the second type. Within a structural body containing a central underbody part of the second type, this additional rear portion ensures the connection and cohesion, for the transmissions and absorption of forces from one part to the other, between the central underbody part 10 according to the first type and the rear structural part 100.

The solution described here, for the central underbody part 10 of a same vehicle platform, takes into account the constraints linked to the internal combustion engine and to the electric motor for a vehicle which may be either of the two-seat type or of the four-seat type. In other words, each central underbody part described here may be used selectively either in the context of use of an internal combustion engine via the internal combustion engine 11, or in the context of use of an electric motor via the electric motor 12. The design of the central underbody part of the platform concerned may receive the set of interfaces of components for the internal combustion engine (mainly the fuel tank and the associated components) and the set of components for the electric motor (mainly the battery and the associated components). Furthermore, the length adjustment of the central floor between length L1 and L2 allows switching from a platform for a four seat-vehicle to one for a two-seat vehicle or vice versa. A same platform may be adapted and take into account the differences between the two-seat configuration and the four-seat configuration, and of the engine type between the electric motor and the internal combustion engine.

According to one embodiment, the rear edge 13 of the central underbody part 10 of the first type and the rear edge 14 of the central underbody part of the second type are equipped with a same interface element for connection to the rear structural part 100 of the structural body. In other words, the interface element of the rear edge 13 of the first type of central underbody part 10, ensuring connection to the rear part 100 of the structural body, and the interface element of the rear edge 14 of the second type of central underbody part 10, ensuring connection to the rear part 100 of the structural body, are identical.

In the manner illustrated in FIGS. 4 and 5, the first zone B and the second zone C are offset relative to each other in the longitudinal direction X, and are constituted respectively by a rear zone of the central underbody part 10 and by a front zone of the central underbody part 10, viewed in the longitudinal direction X.

The set of first interface elements comprises elements allowing mounting, below a floor 17 (FIG. 8) of the central underbody part 10, of a fuel storage tank 16 intended to supply the internal combustion drive engine 11 and of the components associated with function of said tank 16 and the internal combustion engine 11. The set of second interface elements comprises elements allowing mounting, below the floor 17 of the central underbody part 10, of an electrical energy storage battery 15 intended to supply the electric drive motor 12 and of the components associated with function of said battery 15 and of the electric motor 12.

In the second type of central part 10, the electricity storage battery 15 intended to supply the electric drive motor 12 in the electric motor version is not therefore mounted in the zone intended to receive the fuel tank 16 of the internal combustion engine version. The space left free by the tank 16 in the first zone B when the electric motor is used remains vacant. This space is dimensioned and structured to absorb the energy transmitted during various impacts (front, rear and side) without deforming, in order to observe the criteria of structural integrity.

Figure 8:
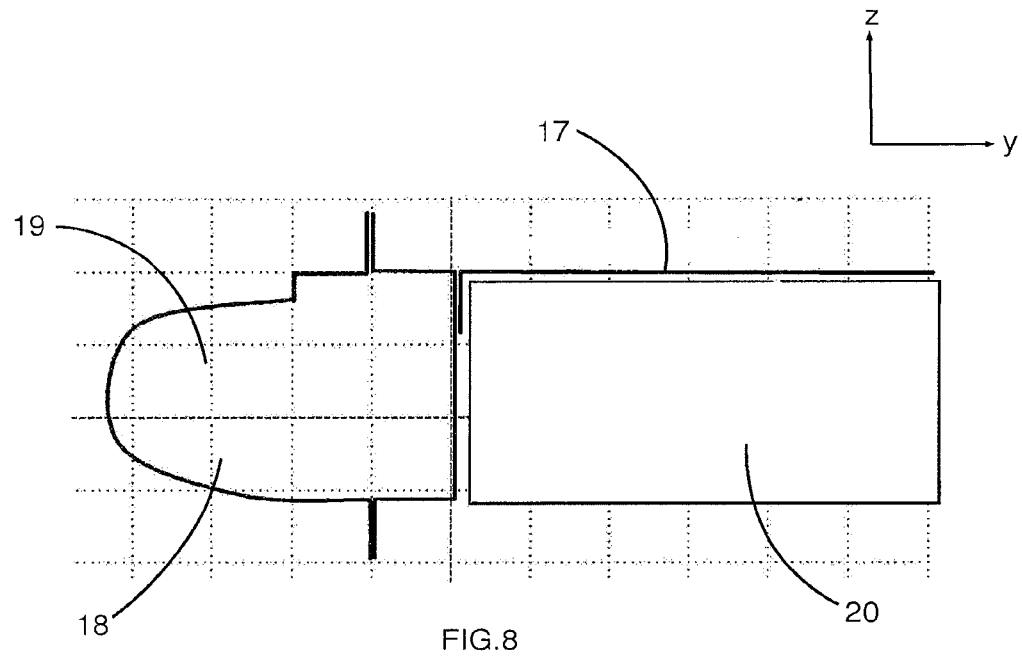
FIG. 8 is a cross-section view, in a lateral-vertical section plane, of a zone of the central underbody part situated close to an inner member.
Figure 9:
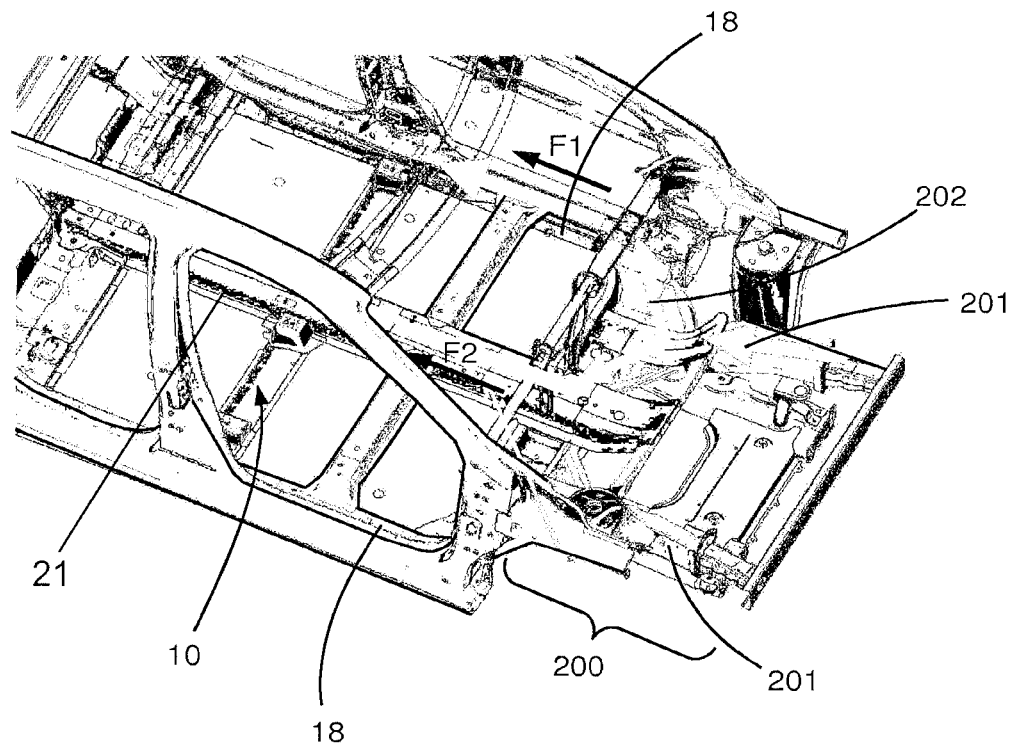
FIG. 9 is a perspective front view of a structural body equipped with a central underbody part according to the invention.

Along each of its longitudinal edges, the central underbody part comprises an inner member 18 (FIGS. 8 and 9). Preferably, the central underbody part 10 therefore comprises this inner member 18 which is an elongate structural element oriented in the longitudinal direction X and which belongs to the structural body and is installed at one of the right or left longitudinal edges of the underbody. The inner member 18 may take the form of a hollow reinforcing body of tubular section with a closed contour, oriented in the longitudinal direction X. The inner member 18 delimits a tubular cavity 19. The floor 17 of the central underbody part 10 is mounted at the upper part of the inner member 18 so as to provide a space 20 below the floor 17, on the side opposite the cab in the longitudinal direction Z, said space 20 being able to house either said fuel storage tank 16 or the battery 15.

The structural body of the motor vehicle, illustrated for example on FIG. 9, comprises a central underbody part 10 described above and a rear structural part 100 firmly attached to the rear edge 13, 14 of the central underbody part 10, the rear structural part 100 carrying either the internal combustion drive engine 11 associated with the components mounted on the central underbody part 10 via the set of first interface elements, or the electric drive motor 12 associated with the components mounted on the central underbody part 10 via the set of second interface elements. In other words, the central underbody part 10 is specific to each type of vehicle because of a different length, and is adapted as required to each type of vehicle, while the rear structural part 100 is identical in both types of vehicle.

The structural body comprises a front structural part 200 including at least one front side member 201, the assembly being arranged such that the central underbody part 10 is interposed between the front structural part 200 and the rear structural part 100 in the longitudinal direction X. The structural body comprises at least one structural piece 202 ensuring an absorption of forces and/or a transmission of forces firstly between the front side member 201 and at least one of the inner members 18 arranged along a longitudinal edge of the central underbody part 10, and secondly between the front side member 201 and a structural longitudinal tunnel 21 of the central underbody part 10, centered in the width of the central underbody part 10 and oriented in the longitudinal direction X.

Said at least one structural piece 202 comprises a connecting element ensuring a connection between the structural piece 202 and the inner member 18, and configured so as to ensure an absorption by the structural piece 202 of longitudinal forces originating from the inner member 18, and/or a transmission of longitudinal forces from the structural piece 202 towards the inner member 18, in particular in the case of a frontal or rear impact applied to a vehicle equipped with the central underbody part 10. On FIG. 9, arrow F1 represents the transmission of longitudinal forces from the structural piece 202 towards the inner member 18 in the case of a frontal impact to the front part 200 of a vehicle equipped with the central underbody part 10.

Said at least one structural piece 202 comprises a connecting element ensuring a connection between the structural piece 202 and the structural longitudinal tunnel 21, and configured so as to ensure an absorption by the structural piece 202 of longitudinal forces originating from the longitudinal tunnel 21, and/or a transmission of longitudinal forces from the structural piece 202 towards the longitudinal tunnel 21, in particular in the case of frontal or rear impact applied to a vehicle equipped with the central underbody part. On the figure, arrow F2 represents the transmission of longitudinal forces from the structural piece 202 towards the longitudinal tunnel 21 in the case of frontal impact onto the front part 200 of a vehicle equipped with the central underbody part 10.

A similar arrangement may be provided on each right and left side of the structural body in the front part 200, by means of a right front side member 201 and a left front side member 201 offset in the lateral direction Y and belonging to the front part 200, said at least one structural piece 202 ensuring a cooperation, as previously defined, between the two right and left front side members 201 and respectively the right and left inner members 18. Said at least one structural piece 202 may in particular comprise a front crossmember connecting the rear ends of the two front side members 201 and the pieces connecting said crossmember to the front ends of the two inner members 18 and the longitudinal tunnel 21.

The structural longitudinal tunnel 21 is preferably delimited by a profiled piece attached to the floor 17 of the central underbody part 10, so as to be oriented in the longitudinal direction X and to delimit, in combination with the floor 17, a hollow reinforcing body of tubular form with a section having a closed contour, arranged above the floor 17. In other words, the hollow body delimited by the longitudinal tunnel 21 is arranged on the cab side, thus very easily and cheaply avoiding all problems linked with corrosion.

The term "hollow body" preferably means that this body delimits a cavity or a volume which is closed or partially open towards the outside. The delimitation of such cavities or volumes greatly contributes to the stiffness of the structural body part in compression, flexion, torsion and shearing, and observes the functional specifications conventionally applied to a body part.

Each hollow reinforcing body is configured (in dimensioning, orientation, cross-section form, spatial arrangement etc.) so as to absorb a majority of forces (compression, torsion, shearing) applied to the central underbody part 10 in the case of impact (front, rear, side etc.) to a vehicle equipped with this part 10.

It should also be specified that the term "reinforcing" preferably means that the hollow body thus delimited supports the great majority or the entirety of the input and output of mechanical forces applied to the central part 10 concerned, in conjunction with the inner members 18.

The invention claimed is:

1. A structural body of a vehicle, comprising:
   a front structural part positioned at a front of the vehicle in a longitudinal direction;
   a rear structural part and positioned at a rear of the vehicle in the longitudinal direction; and
   either a first central underbody part or a second central underbody part interposed between the front structural part and the rear structural part, wherein a length of the vehicle in the longitudinal direction is different depending on whether the first or second central underbody part is selected,
   wherein the first central underbody part and the second central underbody part are each adapted to receive either a set of first or second interface elements, the first set of interface elements allowing for mounting on the first or second central underbody part vehicle components associated with an internal combustion drive engine, the second set of interface elements allowing for mounting on the first or second central underbody part vehicle components associated with an electric drive motor, and
   wherein a rear edge of the first central underbody part and a rear edge of the second central underbody part are each equipped with a same interface element for connection to the rear structural part of the vehicle, the rear structural part supporting the internal combustion drive engine or the electric drive motor.

2. The structural body as claimed in claim 1, wherein a length of the first central underbody part in the longitudinal direction is configured such that the first central underbody part can receive two seats offset in a lateral direction of the vehicle.

3. The structural body as claimed in claim 1, wherein the set of first interface elements is arranged in a first zone of the first or second central underbody part in the longitudinal direction, and the set of second interface elements is arranged in a second zone of the first or second central underbody part in the longitudinal direction, the first and second zones being separate.

4. The structural body as claimed in claim 3, wherein a length of the second central underbody part in the longitudinal direction is configured such that the second central underbody part can receive four seats distributed in two rows offset in the longitudinal direction and each containing two seats offset in a lateral direction of the vehicle.

5. The structural body as claimed in claim 3, wherein the first and second zones are offset relative to each other in the longitudinal direction and are constituted respectively by a rear zone of the first or second central underbody part and by a front zone of the first or second central underbody part.

6. The structural body as claimed in claim 3, wherein a length of the second central underbody part in the longitudinal direction is configured such that the second central underbody part can receive four seats distributed in two rows offset in the longitudinal direction and each containing two seats offset in a lateral direction of the vehicle, and a length of the first central underbody part in the longitudinal direction is configured such that the first central underbody part can receive two seats offset in the lateral direction of the vehicle.

7. The structural body as claimed in claim 1, wherein the set of first interface elements comprises elements allowing mounting, below a floor of the first or second central underbody part, of a fuel storage tank intended to supply the internal combustion drive engine and of components associated with the function of said tank, and the set of second interface elements comprises elements allowing mounting, below the floor of the first or second central underbody part, of an electrical energy storage battery intended to supply the electric drive motor and of components associated with the function of said battery.

8. The structural body as claimed in claim 7, wherein along each longitudinal edge of the first central underbody part or the second central underbody part, the first or second central underbody part comprises an inner member, and the floor of the first or second central underbody part is mounted at an upper part of the inner member so as to provide a space below the floor on a side opposite a cab of the vehicle in a vertical direction, said space being able to house either said tank or said battery.

9. The structural body as claimed in claim 1, wherein the front structural part incldues at least one front side member, and the structural body comprises at least one structural piece ensuring an absorption of forces and/or a transmission of forces firstly between the front side member and at least one inner member arranged along a longitudinal edge of the first or second central underbody part, and secondly between the front side member and a structural longitudinal tunnel of the first or second central underbody part centered in a width of the first or second central underbody part.

10. The structural body as claimed in claim 9, wherein the structural longitudinal tunnel is delimited by a profiled piece attached to the floor of the first or second central underbody part so as to be oriented in the longitudinal direction and so as to delimit, in combination with the floor, a hollow reinforcing body of tubular form with a section of closed contour, arranged below the floor.

* * * * *